United States Patent [19]

Yabuuchi et al.

[11] Patent Number: 4,563,749

[45] Date of Patent: Jan. 7, 1986

[54] FLOATING POINT DIGITAL DIFFERENTIAL ANALYZER

[75] Inventors: Shigeru Yabuuchi, Tokyo; Takeyuki Endo, Kodaira; Kazuyuki Kodama, Hachioji; Jushi Ide, Mito, all of Japan

[73] Assignee: Hitachi, Ltd., Tokyo, Japan

[21] Appl. No.: 449,662

[22] Filed: Dec. 14, 1982

[30] Foreign Application Priority Data

Dec. 18, 1981 [JP] Japan ................................. 56-203719

[51] Int. Cl.$^4$ .............................................. G06J 1/02
[52] U.S. Cl. ..................................................... 364/702
[58] Field of Search .......................................... 364/702

[56] References Cited

U.S. PATENT DOCUMENTS

| | | | |
|---|---|---|---|
| 3,590,231 | 6/1971 | Wenzel | 364/702 |
| 3,598,974 | 8/1971 | Lincoln | 364/702 |
| 3,748,440 | 7/1973 | Alexander | 364/702 |
| 4,293,918 | 10/1981 | Asakawa | 364/702 |
| 4,365,309 | 12/1982 | Noguchi et al. | 364/702 |
| 4,414,640 | 11/1983 | Yabuuchi et al. | 364/702 |

OTHER PUBLICATIONS

McGhee et al., "The Extended Resolution Digital Differential Analyzer: A New Computing Structure for Solving Differential Equations", *IEEE Transactions on Computers*, vol. C-19, No. 1, Jan. 1970, pp. 1-9.
Hannington et al., "A Floating-Point Multiplexed DDA System", *IEEE Transactions on Computers*, vol. C-25, No. 11, Nov. 1976, pp. 1074-1077.
G. Hannington, "Improvements to Binary Floating-Point Digital Differential Analyzers", *Electronics Letters*, vol. 16, No. 9, Apr. 24, 1980, pp. 337-338.
Brafman et al., "An Incremental Computer", *IEEE Transactions on Computers*, vol. C-26, No. 11, Nov. 1977, pp. 1072-1081.

*Primary Examiner*—James D. Thomas
*Assistant Examiner*—Dale M. Shaw
*Attorney, Agent, or Firm*—Antonelli, Terry & Wands

[57] ABSTRACT

In a floating point digital differential analyzer, multiplication and division of constants are carried out by an adder which truncates a summation $SDY_i$ of 1 secondary increments calculated by $$SDY_i = \sum_{j=1}^{l} \Delta Y_{i,j} = SDY_{i,l-1} + \Delta Y_{i,l}$$

into a third increment having an n-bit mantissa including a sign bit, and an integrator for carrying out an integration of $$R_i = R_{i-1} + Y_i \Delta X_i - \Delta Z_i$$

irrespective of a value of a first increment $\Delta X_i$ to generate $\Delta Z_i$ from $R_i$.

3 Claims, 17 Drawing Figures

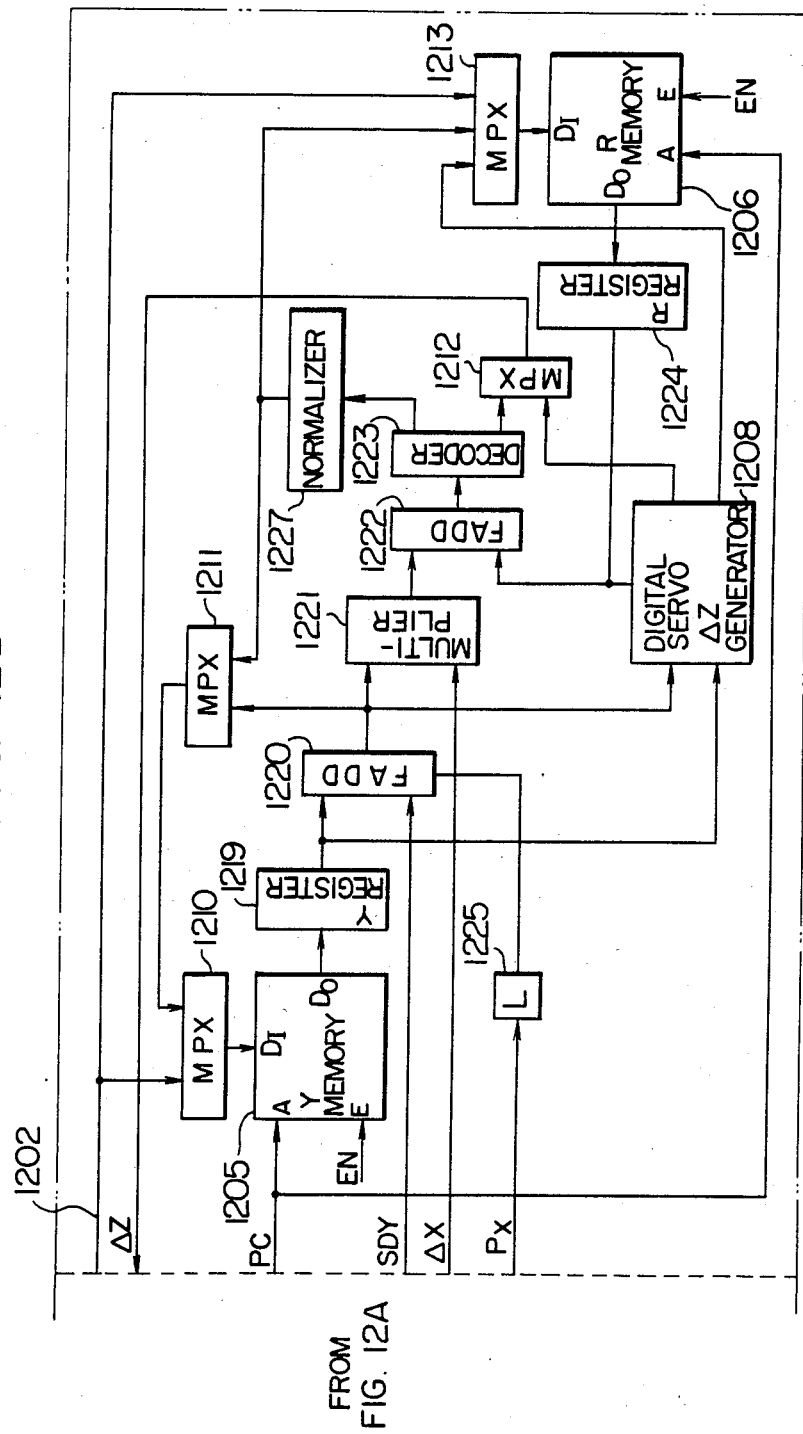

FIG. 13

| | EL | $P_X$ | $\Delta X_A$ | $P_1$ | $\Delta Y_{A1}$ | $P_2$ | $\Delta Y_{A2}$ | $P_3$ | $\Delta Y_{A3}$ |
|---|---|---|---|---|---|---|---|---|---|
| ADDR.1 | ADD | 0 | DX | 0 | 0 | 0 | 0 | 0 | 0 |
| ADDR.2 | INT | 0 | 1 | 0 | 0 | 0 | 0 | 0 | 0 |
| ADDR.3 | INT | 0 | 0 | 0 | 2 | 0 | 0 | 0 | 0 |

OPERATION SEQUENCE

FIG. 14

| | EL | $P_X$ | $\Delta X_A$ | $P_1$ | $\Delta Y_{A1}$ | $P_2$ | $\Delta Y_{A2}$ | $P_3$ | $\Delta Y_{A3}$ |
|---|---|---|---|---|---|---|---|---|---|
| ADDR.1 | SRV | 0 | DX | 1 | 2 | 0 | 0 | 0 | 0 |
| ADDR.2 | INT | 0 | 1 | 0 | 0 | 0 | 0 | 0 | 0 |
| ADDR.3 | INT | 0 | 0 | 0 | 1 | 0 | 0 | 0 | 0 |

OPERATION SEQUENCE

FIG. 15

| | EL | $P_X$ | $\Delta X_A$ | $P_1$ | $\Delta Y_{A1}$ | $P_2$ | $\Delta Y_{A2}$ | $P_3$ | $\Delta Y_{A3}$ |
|---|---|---|---|---|---|---|---|---|---|
| ADDR.1 | SRV | 0 | DX | 0 | 2 | 0 | 0 | 0 | 0 |
| ADDR.2 | INT | 0 | 1 | 0 | 0 | 0 | 0 | 0 | 0 |
| ADDR.3 | INT | 0 | 0 | 1 | 1 | 0 | 0 | 0 | 0 |

OPERATION SEQUENCE

FLOATING POINT DIGITAL DIFFERENTIAL ANALYZER

The present invention relates to a digital differential analyzer (hereinafter referred to as DDA) having addition, subtraction, multiplication and division functions for floating point numbers.

The DDA is an arithmetic apparatus specifically designed so that variables to be handled among arithmetic operations are converted to increments, thereby simplifing the hardware configuration while precisely and quickly solving a differential equation and/or generating a complex curve or curved surface.

The DDA practically used so far utilizes fixed point arithmetic which is disclosed in "Electronic Computer Handbook", edited by Information Processing Society of Japan, 8th edition, pages 8 to 37. When fixed point arithmetic is used, however, all variables to be processed in an arithmetic unit such as an integrator must be scale-converted.

The scale conversion is a manually operated very complex work as is the case of an analog computer. In addition, since a maximum of the variable is predicted for use as a scale conversion coefficient, a significant error will be included in the result of an arithmetic operation if the predicted value is not correct.

Furthermore, in fixed point arithmetic, the dynamic range of the variable is too narrow to apply the system to a conventional scientific and technical calculation.

In order to resolve those problems, a floating point digital differential analyzer (hereinafter referred to as FPDDA) has been proposed. (See Japanese Patent Application Laid-Open Nos. 57-39472 and 57-120157.) The proposed FPDDA does not have a data processing function nor addition, subtraction, multiplication and division functions but has a primary function of numeric integration.

Thus, in the use of the apparatus, the FPDDA is connected to a computer to form a FPDDA system. The computer computes initial values for the FPDDA, sets the initial values into the FPDDA, starts and stops the arithmetic operation of the FPDDA, reads in arithmetic operation results from the FPDDA and inputs and outputs data from and to an external device. For the initial values, the floating point addition, subtraction, multiplication and division operations for floating point numbers are required and hence the computer must have such arithmetic operation functions.

If the FPDDA has those arithmetic operation functions, the computer may be an inexpensive microcomputer without the floating point arithmetic operation functions. Accordingly, an inexpensive FPDDA system can be constructed.

It is an object of the present invention to provide a FPDDA in which a floating point arithmetic operation of floating point numbers is allowed in order to attain an inexpensive and fast operable FPDDA system.

In order to achieve the above object, in accordance with a feature of the present invention, two novel arithmetic units (adder and integrator) of the FPDDA are combined with a known arithmetic unit to allow the FPDDA to carry out the addition, subtraction, multiplication and division operations, particularly the multiplication and division operations, of the floating point numbers.

The present invention will be apparent from the following detailed description taken in conjunction with the accompanying drawings, in which:

FIGS. 12A and 12B, show a circuit of an embodiment of the FPDDA of the present invention which carries out the addition, subtraction, multiplication and division operations for the constants;

FIG. 13 shows a bit configuration of a control instruction for the arithmetic unit of FIG. 7;

FIG. 14 shows a bit configuration of a control instruction for the arithmetic unit of FIG. 8; and FIG. 15 shows a bit configuration of a control instruction for the arithmetic unit of FIG. 10.

Prior to the explanation of the present invention, the operation method of the existing FPDDA is first explained.

The conventional FPDDA was developed for primarily solving a differential equation and an integration operation as a primary function thereof. The integration operation is explained below.

Figure 2A:
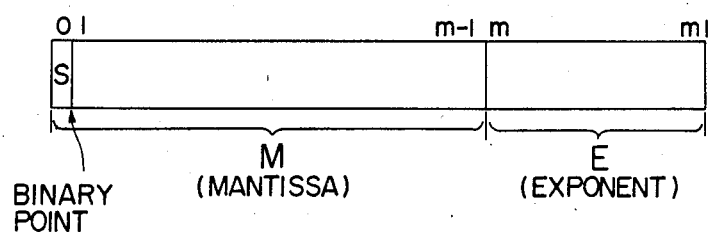
FIGS. 2A and 2B, show a data format of a floating point number used in the arithmetic operation of the FPDDA.
Figure 2B:
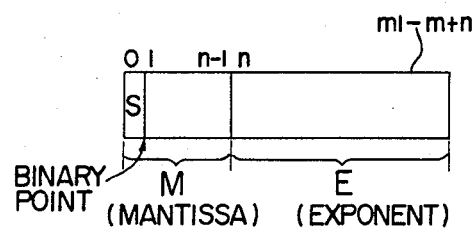

The variables used in the operation of the FPDDA are floating point numbers which are in one of the data formats shown in FIGS. 2A and 2B.

The variable in the data format of FIG. 2A comprises an m-bit mantissa M including one bit in a unit postion ($2^0$) of an integer portion for representing a sign (S) and (m−1) bits from a first position ($2^{-1}$) to a (m−1)-th, position ($2^{-m+1}$) in a fraction portion, and a (m1−m+1)-bit exponent E from an m-th position ($2^{-m}$) to an m1-th position ($2^{-m1}$) in the fraction portion.

On the other hand, the variable in the data format of FIG. 2B comprises an n-bit mantissa M including one bit in a unit position in an integer portion for representing a sign (S) and (n−1) bits from a first position to a (n−1)-th position in a fraction area, and a (m1−m+1)-bit exponent E from a n-th position to (m1−m+n)-th position in the fraction portion. The variables which belong to the data format of FIG. 2A are integrand Y, a residue R of integration and a sum SDY of input variables, which are not represented by increments. On the other hand, the variables which belong to the data format shown in FIG. 2B are an increment $\Delta Y$ of input variable, an increment $\Delta X$ of independent variable of integration and an increment $\Delta Z$ of output variable, which are represented by the increments. Hereinafter, ΔX is referred to as a first increment, ΔY as a second increment and ΔZ as a third increment.

The integration operation in the operation cycles (hereinafter referred to as iterations) of the FPDDA is carried out in the following three main operation phases.

(1) Phase P (pickup phase)

The j-th secondary increments $\Delta Y_{i,j}$ in the i-th iterations, where $j=1 \sim l$ (l: the number of inputs), are floating point-added to calculate a total increment $SDY_i$.

$$SDY_i := \sum_{j=1}^{l} \Delta Y_{i,j} = SDY_{i,l-1} + \Delta Y_{i,l} \quad (1)$$

(2) Phase Y (update phase)

A content ($Y_{i-1}$) of a register Y of the integrator in one iteration earlier period and the total increment $SDY_i$ are floating point-added and the sum thereof is loaded to the register Y as the content thereof in an i-th iteration. That is, the following operation is carried out.

$$Y_i := Y_{i-1} + SDY_i \quad (2)$$

(3) Phase I (integration phase)

$Y_i$ and the content ($R_{i-1}$) of a register R are added to produce a sum $R_i$, and higher order n bits (when n is an integer no smaller than 2) including an overflow are extracted as $\Delta Z_i$ in accordance with the operation method described in Japanese Patent Application Laid-Open No. 57-39472, and $\Delta Z_i$ is subtracted from the sum $R_i$ and the difference thereof is loaded to the register R. That is, the following operation is carried out $$R_i := R_{i-1} + Y_i \cdot \Delta X_i - \Delta Z_i \quad (3)$$

If $\Delta X_i$ is zero, the operation of the equation (3) is not carried out and zero is outputted as the value of $\Delta Z_i$.

The value $\Delta Z_i$ represents the third increment in the i-th iteration. The functions of the registers Y and R will be explained in detail in conjunction with FIGS. 12A and 12B.

An adder and an integrator of the FPDDA which are novel arithmetic units of the present invention used for the floating point addition, subtraction, multiplication and division operations are now explained.

(1) Adder

This arithmetic unit calculates a total of l secondary increments in accordance with the operation shown by the equation (1) and truncates the total to a third increment having n bits in the mantissa including a sign bit as shown by the data format of FIG. 2B.

The operation of the adder comprises three phases (phases P, Y and I) like the integration operation described above. The phases P and Y carry out exactly the same operations (equations (1) and (2)) as those of the integration operation described above.

In the phase I of the adder, if the first increment $\Delta X_i$ in the i-th iteration is not zero, the third increment $\Delta Z_i$ is calculated from $Y_i$ calculated in the phase Y in the i-th iteration in accordance with an operation method described below. Then, $\Delta Z_i$ is subtracted from $Y_i$ and the difference thereof is normalized for use as $Y_i$ in the next iteration.

On the other hand, if the first increment $\Delta X_i$ is zero, the third increment $\Delta Z_i$ is set to zero and $Y_i$ calculated in the phase Y in the i-th iteration is held as it is for use in the next iteration.

Figure 3:
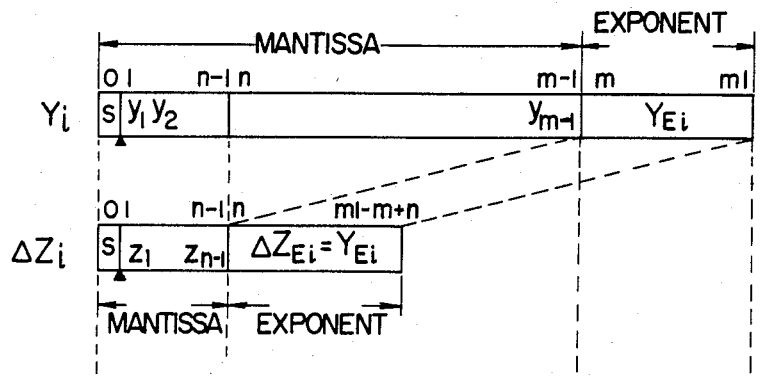
FIG. 3 shows a content of an arithmetic operation of an adder of the present invention.
Figure 3:
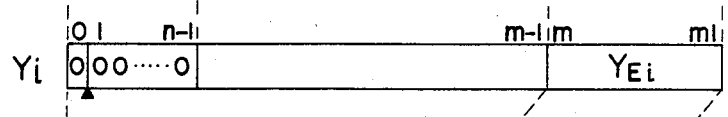
Figure 3:
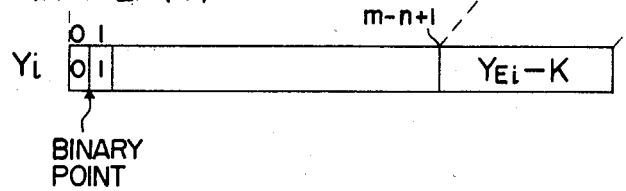

Referring to FIG. 3, a method for generating the third increment $\Delta Z_i$ when $\Delta X_i$ is not zero is now explained.

In the present invention, $Y_i$ and $\Delta Z_i$ are expressed as follows and $\Delta Z_i$ is generated in the following steps (i)–(iV).

$$Y_i = Y_{Mi} \times 2^{YEi} = S \cdot Y_1 Y_2 \ldots Y_{m-1} \times 2^{YEi} \quad (4)$$
$$\Delta Z_i = \Delta Z_{Mi} \times 2^{\Delta ZEi} = S \cdot z_1 z_2 \ldots z_{n-1} \times 2^{\Delta ZEi} \quad (5)$$

where S is the sign bit, "." is a binary point, $y_1 - Y_{m-1}$ are values in the first portion to the (m−1)-th position in the fraction portion of $Y_{Mi}$, and $z_1 - z_{n-1}$ are values in the first position to the (n−1)-th position of the fraction portion of $\Delta Z_{Mi}$, and $Y_1 - Y_{m-1}$ and $z_1 - z_{n-1}$ are represented either by "0's" or "1's", and n<m.

(i) The high order n bits of $Y_{Mi}$ including the sign bit are taken as the high order n bits of $\Delta Z_{Mi}$, and the value of $Y_{Ei}$ is outputted as $\Delta Z_{Ei}$.

(ii) Each of the high order n-bits of $Y_{Mi}$ is set to zero.

(iii) The value of $Y_{Mi}$ calculated in the step (ii) is checked. If it is zero, the value of $Y_{Mi}$ is held as it is and the operation is terminated. If it is not zero, the step (iv) is carried out.

(iv) $Y_{Mi}$ is shifted leftward by K positions until the value of the first position in the fraction portion of $Y_{Mi}$ assumes "1", and the value of $Y_{Ei}$ is reduced by K (normalization).

(2) Integrator

The difference between the integrator of the present invention and the prior art integrator resides in the control for the generation of the third increment shown in the equation (3). In the prior art, if the value of the first increment $\Delta X_i$ is zero, the integration of the equation (3) is not carried out and the value of $\Delta Z_i$ is set to zero. On the other hand, the integrator of the present invention always carries out the integration of the equation (3) irrespective of the value $\Delta X_i$ and generates $\Delta Z_i$ from $R_i$ in accordance with the operation method described in Japanese Patent Application Laid-Open No. 57-39472.

Figure 4:
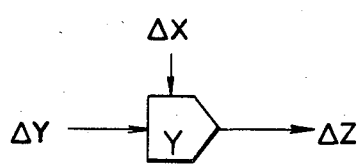
FIG. 4 shows a symbol of an arithmetic unit of the FPDDA of the present invention.

The two arithmetic units of the present invention have thus been described. The operation method of the present invention for adding and subtracting the floating point constant (hereinafter simply referred to as constants) by those arithmetic units is now explained. In the following description, the arithmetic unit of the present invention is represented by a symbol shown in FIG. 4, in which a variable in the symbol represents the content of the register Y.

(1) Addition of constants

Figure 5:
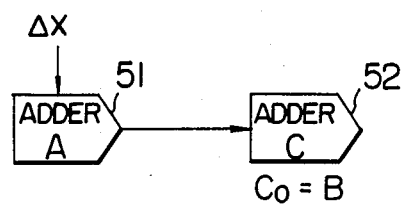
FIG. 5 shows a constant adder.

In the present invention, the addition of the constants A and B as represented by an equation (6) is carried out by combining adders 51 and 52 of the FPDDA of the present invention as shown in FIG. 5.

$$C := A + B \quad (6)$$

Figure 1:
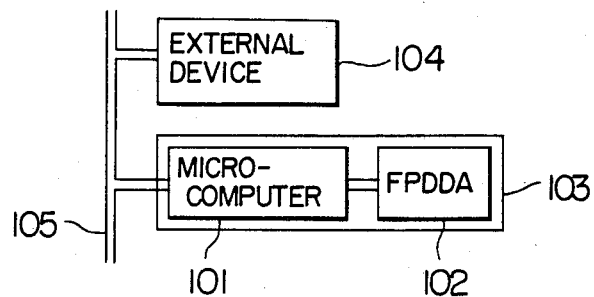
FIG. 1 shows a configuration of FPDDA system of the present invention.

In the present invention, prior to the run of the FPDDA of FIG. 5, the constants A and B are loaded, as initial values, to the register Y of the adder 51 and the register Y of the adder 52, respectively, by the computer 101 shown in FIG. 1. Thereafter, the FPDDA is run and the sum C of the equation (6) is produced in the register Y of the adder 52 in several iterations.

The initial value A of the register Y of the adder 51 is expressed by the following equation.

$$A = (S \cdot 2^0 + a_1 \cdot 2^{-1} + a_2 \cdot 2^{-2} + \ldots + a_{n-1} \cdot 2^{-m+1}) \cdot 2^{ea} \quad (7)$$

Since the secondary increment $\Delta Y$ is not present in the adder 51, the adder 51 produces the third increment $\Delta Z_i$ expressed by the following equation in the first iteration in accordance with the step (i) of FIG. 3, and transfers it to the adder 52.

$$\Delta Z_i = (S \cdot 2^0 + a_1 \cdot 2^{-1} + \ldots + a_{n-1} \cdot 2^{1-n}) \cdot 2^{ea} \quad (8)$$

The content of the register Y of the adder 51 at the end of the first iteration is expressed as follows in accordance with the step (ii) of FIG. 3.

$$Y_i = (a_n \cdot 2^{-n} + a_{n+1} \cdot 2^{-(n+1)} + \ldots + a_{m-1} \cdot 2^{-m+1}) \cdot 2^{ea} \quad (9)$$

The adder 52 carries out the operations of the equations (1) and (2). In the first iteration, the sum of the partial value $\Delta Z_i$ of the constant A expressed by the equation (8) and the constant B is loaded in the register Y of the adder 52.

As shown in FIG. 5, since $\Delta X$ which is fixed to 1.0 is inputted as the first increment of the adder 51, the adder 51 generates $\Delta Z_i$ as represented by the equation (8) in each iteration until the residue $R_i$ of the constant A reaches zero. Accordingly, the sum C of the constants A and B is produced in the register Y of the adder 52 with a high precision in several iterations.

(2) Subtraction of constants

Figure 6:
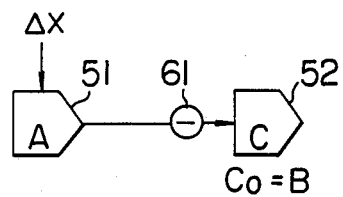
FIG. 6 shows a constant subtractor.

In the present invention, the subtraction of the constants A and B expressed by an equation (10) is carried out by combining the adders of the FPDDA of the present invention as shown in FIG. 6.

$$C := B - A \quad (10)$$

In FIG. 6, numeral 61 ($\ominus$) denotes an inverter. Except for the inverter, the circuit carries out the subtraction of the constants in accordance with exactly the same procedures and principle as those of the addition operation described above. The difference is produced in the register Y of the adder 52.

(3) Multiplication of constants

Figure 7:
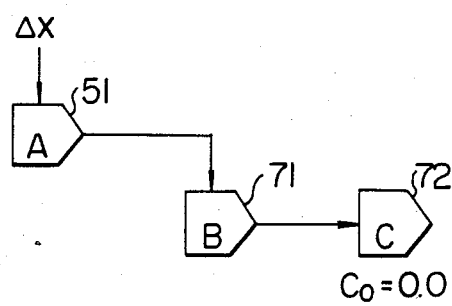
FIG. 7 shows a constant multiplier of the present invention.

In the present invention, the multiplication of the constants A and B expressed by an equation (11) is carried out by combining the adder 51 and integrators 71 and 72 of the FPDDA of the present invention as shown in FIG. 7.

$$C := A \times B \quad (11)$$

The arithmetic unit 72 may be an adder.

The initial values are set into the registers Y of the three arithmetic units in the manner described above and the FPDDA is run to calculate the product C. As the initial values, the constant A is set into the register Y of the adder, the constant B is set into the register Y of the integrator 71, zero is set into the register Y of the integrator 72, and zero is set into a register R of the integrator 72.

In the arithmetic unit of FIG. 7, the adder 51 truncates the constant A expressed by the equation (7) to the n-bit third increment $\Delta A_i$ corresponding to $\Delta Z_i$ expressed by the equation (8) and transfers it to the integrator 71 as the first increment. Accordingly, the integrator 71 carries out the following integration in accordance with the equation (3).

$$R_i = R_{i-1} + B \cdot \Delta A_i - \Delta Z_i \quad (12)$$

where $\Delta A_i$ is a value produced by the adder 51 in the i-th interation and represents a partial value of the constant A.

In this manner, a partial product ($B \cdot \Delta A_i$) of the constants A and B is calculated in the integrator 71 and it is truncated to an n-bit value, which is then supplied to the integrator 72 as the second increment. The integrator 72 calculates a total of the partial products of the constants A and B in accordance with the equation (1) and (2).

By repeating the above operation of the FPDDA, the multiplication expressed by the equation (11) is carried out and the product C is produced in the register Y of the integrator 72.

The advantage of the integrator of the present invention is now discussed. In the integration of the equation (12), by the prior art integrator, when the constant A has been outputted as the third increment of the adder 51, the first increment $\Delta A_i$ in the subsequent iteration is zero and hence the operation of the equation (12) is not carried out and the residue R is not produced. As a result, the residue of the partial product remains in the register R resulting in an error in the product C of the constants A and B.

On the other hand, the integrator of the present invention carries out the operation of equation (12) irrespective of the value of the first increment so that the residue of the partial product in the register can be outputted even after $\Delta A_i$ has reached zero. Accordingly, the multiplication of the equation (11) can be carried out with a high precision.

(4) Division of constants

Figure 8:
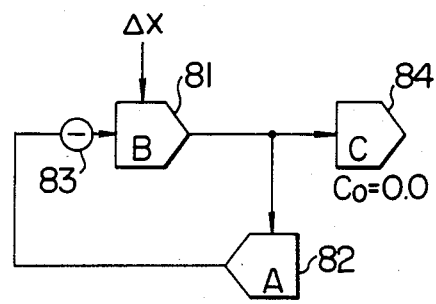
FIG. 8 shows a constant divider for a positive divisor of the present invention.

In the present invention, the division of the constants A and B expressed by an equation (13) is carried out by combining the integrator of the FPDDA of the present invention and a digital servo disclosed in Japanese Pat. No. 946778 as shown in FIG. 8.

$$C := B/A \quad (13)$$

In the division of the present invention, the operation expressed by the following equation is carried out by the FPDDA to produce a quotient by an implicit operation method.

$$\epsilon = (B - A \cdot F) \to 0.0 \quad (14)$$

A variable F is set to an appropriate value and a product of the constant A and the variable F is calculated and the difference $\epsilon$ from the constant B is then calculated. The value of the variable F is controlled based on the value of $\epsilon$ to cause $\epsilon$ to approach zero, and the value of the variable F at that time is determined as the quotient C of the equation (13).

A digital servo 81 in FIG. 8 is an arithmetic unit which changes the gain of the third increment by a factor of 2 or $\frac{1}{2}$ and controls the sign of the third increment depending on the magnitude relationship between the value $Y_{i-1}$ of the register Y in one iteration earlier period of the digital servo and the current value $Y_i$ to approach cause the value of the register Y of the digital servo to approach zero. Accordingly, the operation of the equation (14) can be readily carried out by utilizing the digital servo 81.

As the initial values of the arithmetic units in FIG. 8, the dividend B is set to the digital servo 81, the divisor A is set to the integrator 82 and zero is set to the integrator 83 in which a solution is to be stored.

In the first iteration, the digital servo 81 generates the third increment $\Delta F_1$ with a predetermined weight. The integrator 82 carries out the integration of $$R_1 : R_0 + A \cdot \Delta F_1 - \Delta Z_1 \qquad (15)$$

and inverts the third increment $\Delta Z_1$ by an inverter 83 and supplies the inverted $\Delta Z_1$ to the digital servo 81. The value $\epsilon_2$ of the register Y of the digital servo 81 in the next iteration is expressed by $$\epsilon_2 := B - \Delta Z_1 = B - (A \cdot \Delta F_1) \qquad (16)$$

The digital servo 81 produces the third increment $\Delta F_2$ such that $\epsilon_2$ reaches zero.

The value $\epsilon_i$ of the register Y of the digital servo 81 in the i-th iteration after several iterations of the above operation is expressed by $$\epsilon_i \approx B - A \cdot \sum_{j=1}^{i} \Delta F_j \qquad (17)$$

The summation of $\Delta F_j$ in the right side of the above equation is stored in the register Y of the integrator 84. Accordingly, when $\epsilon_i = 0$, the content of the register Y of the integrator 84 is determined as the quotient C of the equation (13).

As described above, the integrator 82 produces the residue of the product of the constant A and $\Delta F_j$ as the third increment even when the first increment is zero so that an error in the operation of the equation (17) can be reduced.

Figure 9:
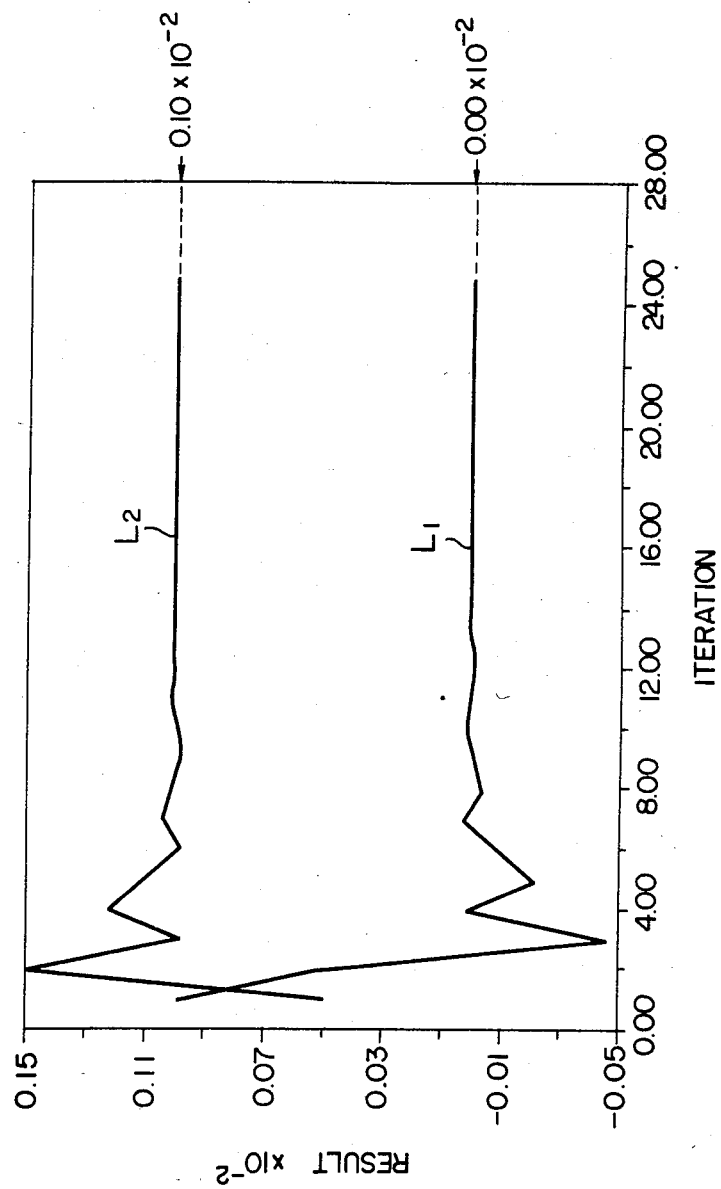
FIG. 9 shows an example of constant division operation by the divider of FIG. 8.

FIG. 9 shows an operation result in accordance with the above method for the operation of 0.001/1.000001. As seen from a curve $L_1$ of FIG. 9, $\epsilon$ which is the content of the register Y of the digital servo 81 is very close to zero in and after the 16-th iteration and an approximate solution 0.001 is obtained as seen from a curve $L_2$.

Figure 10:
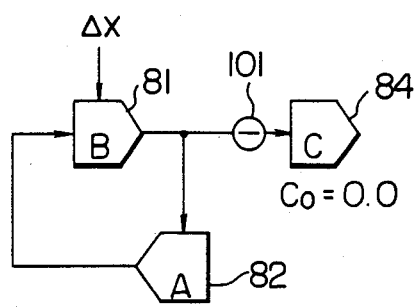
FIG. 10 shows a constant divider for a negative divisor of the present invention.

In the division method of the present invention, the arithmetic units are switched depending on the sign of the divisor to prevent the oscillation of a feedback loop of the digital servo. FIG. 8 shows the arithmetic unit for a positive divisor. When the divisor is negative, an inverter 101 is inserted at an imput of the integrator 84 as shown in FIG. 10.

The addition, subtraction, multiplication and division operations of the constants by the FPDDA of the present invention have thus been generally described. An arithmetic unit which carries out the following algebraic operation which is an example of a combination of the above arithmetic operations is shown in FIG. 11.

$$H := (A \cdot B + C)/D + E(F + G) \qquad (18)$$

Figure 11:
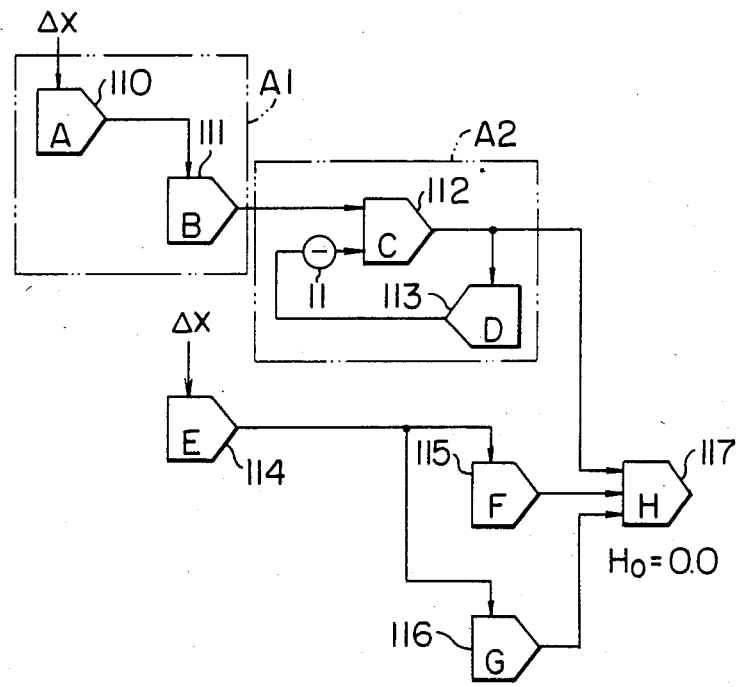
FIG. 11 shows an algebraic operation unit which adopts the arithmetic operation method of the present invention.

In order to carry out the operation of the equation (18) by the circuit of FIG. 11, constants A, B, C, D, E, F, G and H (H = $H_0$ = 0) are set into arithmetic units 110, 111, 112, 113, 114, 115, 116 and 117, respectively.

In an arithmetic block A1 which comprises the arithmetic units 110 and 111, the multiplication A·B is carried out and a product A·B is added to the constant C in the arithmetic unit 112. As a result, (A·B+C) is stored in the register Y of the arithmetic unit 112, and in an arithmetic block A2 which comprises the arithmetic unit 113 and an inverter 11, the division (A·B+C)/D is carried out and the quotient thereof is stored in the register Y in place of (A·B+C)

The multiplication E·F is carried out by the arithmetic units 114 and 115, and the multiplication E·G is carried out by the arithmetic units 114 and 115.

The operation results (A·B+C)/D, E·F and E·G are added to the initial value ($H_0 = 0$) of the arithmetic unit 117 to complete the operation of the equation (18), and the result thereof is stored in the register Y of the arithmetic unit 117.

The present invention is explained in further detail in conjunction with preferred embodiments.

FIG. 1 shows a configuration of a FPDDA system of the present invention which utilizes a microcomputer.

In FIG. 1, a microcomputer 101 having no floating point arithmetic operation function and a FPDDA 102 are combined to form a FPDDA system 103. The microcomputer 101 inputs and outputs data from and to an external device 104 through a common bus 105 and controls the arithmetic operations in the FPDDA 102.

Figure 12A:
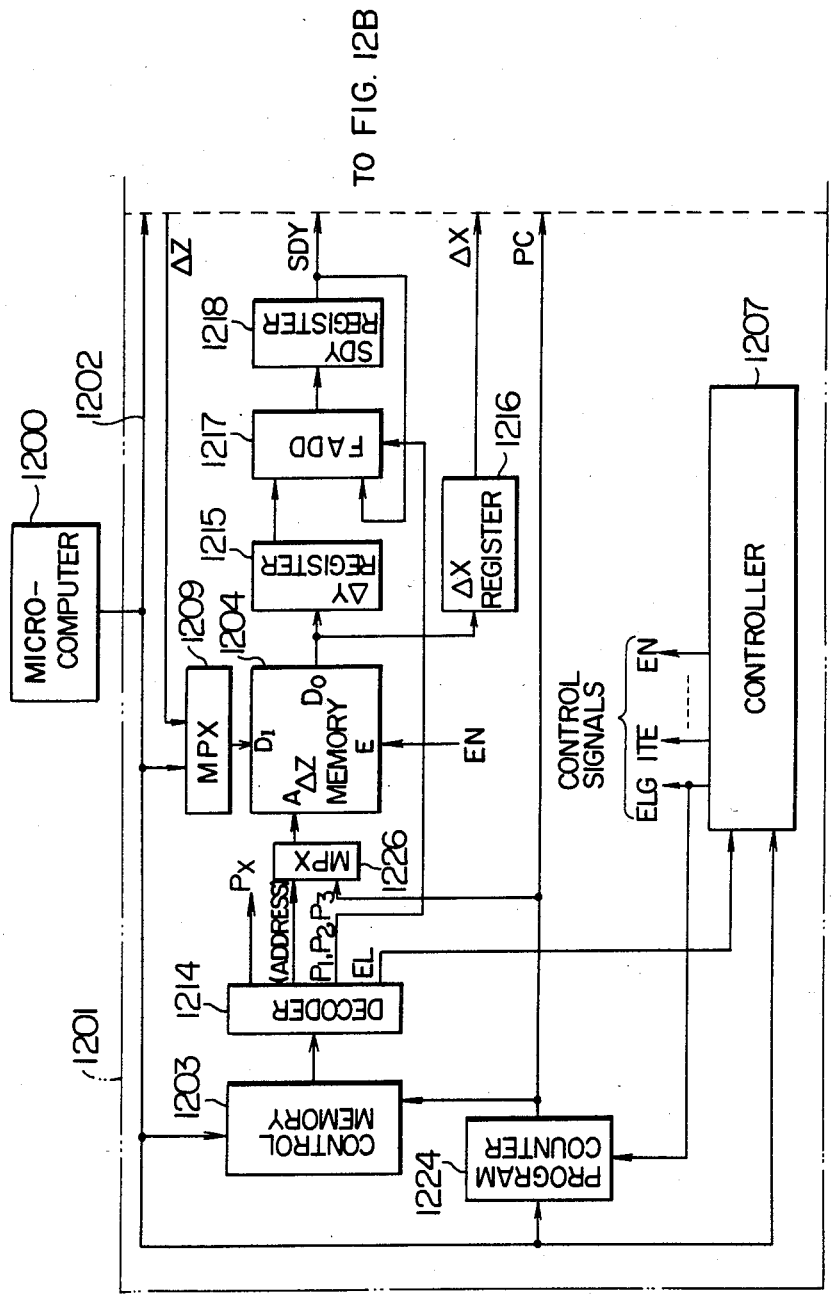

FIGS. 12A and 12B show block diagrams of the FPDDA of the present invention.

Referring to FIGS. 13–15, the operation of the FPDDA of FIGS. 12A and 12B is now explained.

Each iteration of a FPDDA 1201 is carried out by three phases, phases P, Y and I represented by the equations (1)–(3). FIG. 12A shows the block diagram of the FPDDA which primarily carries out the phase P, and FIG. 12B shows that which primarily carries out the phases Y and I.

In FIGS. 12A and 12B, a microcomputer 1200 transfers initial values to a $\Delta Z$ memory 1204 of the FPDDA which stores the third increment $\Delta Z_i$, a Y memory 1205 which stores the operation result of the equation (2) (the content of the register Y) and an R memory 1206 which stores the operation result of the equation (3) (the content of the register R), through a common bus line 1202 and multiplexers 1209, 1210 and 1213, respectively, and transfers an operation control instruction of the FPDDA to a control memory 1203.

The microcomputer 1200 further transfers a predetermined value to a program counter 1224 which specifies an address of the control memory 1203, and starts and stops a controller 1207 which generates a sequence of timing signals necessary to carry out the operations of the FPDDA.

The operations of the FPDDA are carried out by executing the operation control instruction read out from the address PC of the control memory 1203 specified by the program counter, in accordance with the series of timing signals generated by the controller 1207.

The operation control instruction stored at the address PC specified by the program counter 1224 has a bit configuration for specifying a type of arithmetic unit used in the operation in a predetermined iteration (for example, i-th iteration) and an operation mode related thereto.

FIG. 13 shows an example of the bit configuration of the operation control instruction.

In FIG. 13, EL indicates the type of arithmetic unit used to carry out a desired operation, $\Delta X_A$ indicates an address of the $\Delta Z$ memory 1204 in which the first increment $\Delta X_i$ of the FPDDA is stored, $P_X$ indicates a sign of $\Delta X_i$, $\Delta Y_{A1}$, $\Delta Y_{A2}$ and $\Delta Y_{A3}$ (the number of inputs being 3 in the present example) indicate addresses of the $\Delta Z$ memory 1204 in which $\Delta Y_{i,1}$, $\Delta Y_{i,2}$ and $\Delta Y_{i,3}$ of the equation (1) are stored, respectively, and $P_1$, $P_2$ and $P_3$ indicate one-bit flags for controlling the signs of $\Delta Y_{i,1}$, $\Delta Y_{i,2}$ and $\Delta Y_{i,3}$, respectively. If the flags $P_x$, $P_1$, $P_2$ and $P_3$ are "0", it indicates the positive sign and if they are "1" it indicates the negative sign.

The operation of FIG. 12 when the operation method of the present invention is carried out is explained in further detail with reference to the operation control instruction (hereinafter simply referred to as instruction) having the bit configuration of FIG. 13.

The operations in the phases P and Y represented by the equations (1) and (2) are carried out in all of the arithmetic units of the FPDDA. The operations in those phases are carried out in the following manner.

First, the instruction is read out from the address PC of the control memory 1203 specified by the program counter 1224. The instruction read is then decoded by a decoder 1214 and decoded signals in the respective fields of the instruction are transferred to associated circuits.

The decoded signal (EL) of the field EL which indicates the type of arithmetic unit to be used is transferred to the controller 1207, which responds thereto to generate a timing signal necessary to carry out the phases P, Y and I and send it to associated circuits. For example, an enable signal EN is sent to terminals E of the $\Delta Z$ memory 1204, Y memory 1205 and R memory 1206. In FIG. 12, connecting lines between the controller 1207 and those memories are omitted for the purpose of simplification.

In the phase P, the decoded signals ($\Delta Y_{A1}$), ($\Delta X_{A2}$), ($\Delta Y_{A3}$) and ($\Delta X_A$) of the addresses $\Delta Y_{A1}-\Delta Y_{A3}$ and $\Delta X_A$ of the instruction read are supplied to an address terminal of the $\Delta Z$ memory 1204 through the multiplexer 1226 so that $\Delta Y_{i,j}$ (j=1,2,3) and $\Delta X_i$ are sequentially read out from the specified addresses and set in the $\Delta Y$ register 1215 and the $\Delta X$ register 1216.

The $\Delta Y_{i,j}$ sent in the $\Delta Y$ register 1215 and a content ($SDY_{i,0}=0$) of a SDY register 1218 which was reset by the start signal ELG for the arithmetic unit shown in FIG. 14 prior to the i-th iteration are supplied to a floating point adder FADD 1217 to carry out the floating point operation of $$SDY_{i,j}=SDY_{i,0}+\Delta Y_{i,j} \tag{19}$$

and a result thereof is set in the SDY register 1218 $SDY_{i,1}$.

After the operation of the equation (19), $\Delta Y_{i,2}$ set in the $\Delta Y$ register 1215 and the content (SD ($SDY_{i,1}=\Delta Y_{i,1}$) of the SDY register 1218 are supplied to the FADD 1217 to carry out the operation of $$SDY_{i,2}=SDY_{i,1}+\Delta Y_{i,2}=\Delta Y_{i,1}+\Delta Y_{i,2} \tag{20}$$

and a result thereof is set in the SDY register 1218 as $SDY_{i,2}$.

By repeating the above operation, the summation $SDY_i$ of the second increments of the three inputs in the equation (1) is produced in the SDY register 1218.

In the above operation, the SDY register 1218 and the FADD 1217 correspond to accumulators.

When decoded signals (P1), (P2) and (P3) of the sign bit indicate the negative sign, two's complement of the negative increment and $SDY_{i,1}$ are added in the FADD 1217. For example, when $\Delta Y_{i,2}$ is negative, the following operation is carried out.

$$SDY_{j,1}-\Delta Y_{i,2}=\Delta Y_{i,1}-\Delta Y_{i,2} \tag{21}$$

The decoded signal ($P_x$) of the sign bit $P_x$ of the instruction is set in a latch 1225.

In the following phase Y, the operation of the equation (2) is carried out. First, the value $Y_{i-1}$ of the Y register 1219 in one iteration earlier period is read out from the Y memory 1205. The readout is effected by supplying the output PC of the program counter 1224 to the address terminal A of the Y memory 1205 and by the enable signal EN from the controller 1207, and the $Y_{i-1}$ read is set in the Y register 1219.

The floating point addition of the content $SDY_i$ of the SDY register produced in the phase P and $Y_{i-1}$ in the Y register 1219 is carried out in the FADD 1220 with accumulator to produce $Y_i$ in the i-th iteration. The $Y_i$ is then written into the address PC of the Y memory 1205 from the accumulator of the FADD 1220 through the multiplexers 1211 and 1210.

The operations in the phases P and Y described above are common to all of the arithmetic units of the FPDDA as described above. On the other hand, the generation of the third increment $\Delta Z_i$ in the phase I differs from arithmetic unit to arithmetic unit.

The operations of the integrator and the adder of the present invention in the phase I and the operation of the digital servo in the phase I are now explained with reference to FIG. 12B.

(1) Phase I of integrator

In the phase I of the integrator, the operation of the equation (3) is carried out independently of the value of the first increment $\Delta X_i$.

First, the residue $R_{i-1}$ of the integrated value in one iteration earlier period is read out from the address PC of the R memory 1206 in accordance with the same procedures as those for the Y memory and set in the R register 1224. The content $Y_i$ stored in the accumulator of the FADD 1220 obtained in the phase Y is multipled by the content $\Delta X_i$ of the $\Delta X$ register 1216 of FIG. 12A in the multiplier 1221. The output $Y_i \cdot \Delta X_i$ of the multiplier 1221 is added to the content $R_{i-1}$ of the R register 1224 by the FADD 1222. The result thereof is supplied from the FADD 1222 to the decoder 1223 to produce the third increment $\Delta Z_i$ having n-bit (n≧1) mantissa as shown in the data format of FIG. 2B by the decoder 1223 in accordance with the method disclosed in Japanese Patent Application Laid-Open No. 57-39472. The third increment $\Delta Z_i$ is written into the address PC of the $\Delta Z$ memory 1204 through the multiplexor 1212 and the multiplexor 1209 of FIG. 12A. The write address PC to the $\Delta Z$ memory 1204 is sent from the program counter 1224 to the address terminal A of the $\Delta Z$ memory 1204 through the multiplexor 1226.

The residue $R_i$ which corresponds to the integrated value obtained by the FADD 1222 of FIG. 12B less the third increment $\Delta Z_i$ is normalized by a normalization circuit 1227 such that an absolute value of the mantissa of $R_i$ is no smaller than 0.5. The normalized value of $R_i$ is written into the address PC of the R memory 1206 through the multiplexer 1213.

(2) Phase I of adder

In the phase I of the adder, the multiplication of $Y_i$ and $\Delta X_i$ by the multiplier 1221 and the addition of the product thereof and $R_{i-1}$ are carried out in accordance with the same procedures as those in phase I of the integrator. In the adder, an address of the $\Delta Z$ memory 1204 in which numeral 1.0 is stored for $\Delta X_A$ is set by an instruction shown in FIG. 13 stored in the control memory 1203, and the microcomputer 1200 sets the content of the address in the R memory 1206 corresponding to the adder to zero prior to the operation in the procedure described above. Accordingly, the operation result $(Y_i \cdot \Delta X_i + R_{i-1})$ by the FADD 1222 is $Y_i$.

Then, $Y_i$ is sent to the decoder 1223 from the FADD 1222. The decoder 1223 produces the third increment $\Delta Z_i$ which includes the high order n bits of the mantissa $Y_{Mi}$ of $Y_i$ as shown in FIG. 3 as the high order n bits of the mantissa $\Delta Z_{Mi}$ of the third increment $\Delta Z_i$ and the exponent $Y_{Ei}$ of $Y_i$ as the exponent $\Delta Z_{Ei}$ of $\Delta Z_i$. The third increment $\Delta Z_i$ is written into the address PC of the $\Delta Z$ memory 1204 through the multiplexer 1212 and the multiplexer 1209 of FIG. 12A.

The decoder 1223 further sends data having the higher order n bits of $Y_{Mi}$ changed to zero, data of the high order (n+1)-th position to (m−1)-th position of $Y_{Mi}$ and $Y_{Ei}$ to the normalization circuit 1227, which normalizes those data. The normalized data are written into the address PC of the Y memory 1205 from the normalization circuit 1227 through the multiplexors 1211 and 1210.

(3) Phase I of digital servo

The digital servo $\Delta Z$ generation circuit 1208 receives $Y_i$ obtained in the previous phase Y, $Y_{i-1}$ read from the Y memory and stored in the Y register 1219 and the exponent $\Delta Z_{Ei-1}$ of the third increment in one iteration earlier period which was read from the R memory 1206 and stored in the R register 1224, and carries out the following operations to generate the third increment $\Delta Z_i$.

$$\left.\begin{array}{l} \text{If } Y_i = 0, \quad \Delta Z_{Mi} := 0 \\ \text{If } Y_i > 0, \quad \Delta Z_{Mi} := +1 \\ \text{If } Y_i < 0, \quad \Delta Z_{Mi} := -1 \end{array}\right\} \quad (22)$$

$$\left.\begin{array}{l} \text{If } Y_i = 0, \quad \Delta E_i := \Delta Z_{Ei-1} \\ \text{If } Y_i \text{ and } Y_{i-1} \text{ are of opposite sign,} \\ \Delta Z_{Ei} := \Delta Z_{Ei-1} - 1 \\ \text{If } Y_i \text{ and } Y_{i-1} \text{ are of the same sign} \\ \text{and if } \left|\frac{Y_{i-1}}{2}\right| < |Y_i|, \Delta Z_{Ei} := \Delta Z_{Ei-1} + 1 \\ \text{and if } \left|\frac{Y_{i-1}}{2}\right| \geq |Y_i|, \Delta Z_{Ei} := \Delta Z_{Ei-1} - 1 \end{array}\right\} \quad (23)$$

The value $\{0, +1, -1\}$ of $\Delta Z_{Mi}$ is represented $\{$"00", "01", "11"$\}$ by the two high order bits of $\Delta Z_{Mi}$.

The $\Delta Z_i$ generated by the digital servo $\Delta Z$ generation circuit 1208 is written into the address PC of the $\Delta Z$ memory 1204 through the multiplexer 1212 and the multiplexer 1209 of FIG. 12A. The exponent $\Delta Z_{Ei}$ of $\Delta Z_i$ is written into the address PC of the R memory 1206 through the multiplexer 1213.

As described in detail hereinabove, the FPDDA of the present invention does not have an exclusive arithmetic circuit for each arithmetic unit but carries out various operations by changing the instruction in the control memory 1203.

The instructions for carrying out the multiplication and division of the constants in accordance with the present invention by utilizing the arithmetic units shown in FIGS. 7, 8 and 10 are now explained in detail.

FIG. 13 shows instructions for carrying out the multiplication by the multiplier shown in FIG. 7. An instruction in the address location 1 controls the adder 51, an instruction in the address location 2 controls the integrator 71 and an instruction in the address location 3 control the integrator 72. The instruction in the address location 2 for controlling the integrator 71 sets all of $P_1 - P_3$ and $\Delta Y_{A1} - \Delta Y_{A3}$ to zero because of the absence of the secondary increment. An address location 1 in the $\Delta Z$ memory 1204 in which the third increment of the adder 51 is stored is set to $\Delta X_A$. The instruction in the address location 3 for controlling the integrator 72 sets $\Delta X_A$ to zero because of the absence of the first increment and an address location 2 is set to $\Delta Y_{A1}$ in the address location 3 because the third increment of the integrator 71 is supplied as the second increment. As the initial values, the constant A is set in the address location 1 of the Y memory, the constant B is set in the address location 2 and 0.0 is set in the address location 3. The R memory is set to 0.0. M is set to 3.

FIG. 14 shows instructions for carrying out the division by the divider for the positive divisor shown in FIG. 8. An instruction in the address location 1 controls the digital servo 81, an instruction in the address location 2 controls the integrator 82 and an instruction in the address location 3 controls the integrator 84. A code for carrying out the servo operation by the digital servo 81 is specified by SRV in the EL of the instruction in the address location 1. Since the second increment is the inversion of the third increment of the integrator 82, $P_1$ of the address location 1 is set to 1 and $\Delta Y_{A1}$ is set to the address location 2. In the instruction in the address location 2 for controlling the integrator 82, $\Delta X_A$ is set to the address location 1 because the third increment of the digital servo 81 is supplied as the first increment. In the instruction in the address location 3 for controlling the integrator 84, $\Delta Y_{A1}$ is set to the address location 1 because the third increment of the digital servo 81 is supplied as the secondary increment. As the initial values, the constant B is set to the address location 1 of the Y memory, the constant A is set to the address location 2 and 0.0 is set to the address location 3. The address locations 1-3 in the R memory 1206 in FIG. 12B are set to 0.0.

FIG. 15 shows instructions for carrying out the division by the divider for the negative divisor shown in FIG. 10. A difference between FIG. 8 and Fig. 10 resides in that the signs of the second increment of the digital servo 81 and the second increment of the integrator 84 are opposite. Accordingly, the instructions shown in FIG. 15 are different from those of FIG. 14 in that they set $P_1$ in the address locations 1 to 0 and $P_1$ in the address locations 3 to 1.

As described hereinabove, according to the present invention, the floating point constants can be precisely arithmetically operated in the FPDDA so that the application of the FPDDA is expanded and an inexpensive FPDDA system is provided.

What is claimed is:

1. A digital differential analyzer comprising:
  first memory means for storing the value Y of an integrand in a floating point form including a mantissa and an exponent;
  second memory means for storing as a third increment $\Delta Z$ an increment of a quantized output of the integrated value of said integrand in a floating point form including a mantissa and an exponent;
  third memory means for storing a value R which is obtained by subtracting the value of the quantized output from said integrated value, said value R being stored in a floating point form including a mantissa and an exponent;
  first arithmetic operation means connected to receive predetermined values from said second memory means as second increments ($\Delta Y_i$, $1 \sim \Delta Y_{i,l}$) for producing a total increment thereof $$\left( SDY_i = \sum_{j=1}^{l} \Delta Y_{i,j} \right)$$

and for adding the total increment and said value of said integrand ($Y_{i-1}$) to produce a new value of said integrand ($Y_i$), said new value of said integrand being outputted to said first memory means;
second arithmetic operation means connected to receive a predetermined value from said second memory means as a first increment ($\Delta X_i$) for multiplying said new value of said integrand ($Y_i$) from said first arithmetic operation means by said predetermined value and for adding the result of said multiplication ($Y_i \cdot \Delta X_i$) and the value ($R_{i-1}$) of a residue of the integrated value stored in said third memory means, the result of addition ($R_{i-1} + Y_i \cdot \Delta X_i$) being quantized and outputted to said second memory means as the third increment;
third arithmetic operation means for subtracting the third increment ($\Delta Z_i$), outputted from said second arithmetic operation means to said second memory means, from the result of addition obtained by said second arithmetic operation means, the result of subtraction ($R_{i-1} + Y_i \cdot \Delta X_i - \Delta Z_i$) being outputted to said third memory means; and
fourth arithmetic operation means for outputting to said second memory means the third increment ($\Delta Z_i$) obtained by said second arithmetic operation means while setting the mantissa ($\Delta Z_{Mi}$) of said third increment ($\Delta Z_i$) to zero, $+1$ and $-1$ when said new value of integrand ($Y_i$) obtained by said first arithmetic operation means is zero, larger than zero and smaller than zero, respectively, and setting the exponent ($\Delta Z_{Ei}$) of said third increment ($\Delta Z_i$) to $\Delta Z_{Ei-1}$ ($\Delta Z_{Ei-1}$ being the value of the exponent of the third increment read from said second memory means), $\Delta Z_{Ei-1} - 1$, $\Delta Z_{Ei-1} + 1$, and $\Delta Z_{Ei-1} - 1$ when said new value of said integrand ($Y_i$) obtained by said first arithmetic operation means is zero, when said new value of said integrand ($Y_i$) and the value of said integrand ($Y_{i-1}$) before the addition by said first arithmetic operation means are of opposite sign, when both said values of said integrand ($Y_i$) and ($Y_{i-1}$) are of the same sign and $$\left| \frac{Y_{i-1}}{2} \right| < |Y_i|$$

is satisfied, and when both said values of said integrand ($Y_i$) and ($Y_{i-1}$) are of the same sign and $$\left| \frac{Y_{i-1}}{2} \right| \geq |Y_i|$$

is satisfied, respectively,
said second, third and fourth arithmetic operation means being made operative even when the value of the first increment read from said second memory means is zero.

2. A digital differential analyzer according to claim 1, further comprising control means for storing a first constant, a second constant and a numeral having a value of 0.0 in first, second and third address locations of said first memory means, respectively, for storing a numeral having a value of 0.0 in a first address location of said third memory means, for reading the content of the first address location of said first memory means as a value of an integrand and the content of a second address location of said second memory means as a second increment, for operating said first to fourth arithmetic operation means, for storing the third increment obtained by those operations in the first address location of said second memory means, for causing said first arithmetic operation means to perform the operation of addition using this third increment as a second increment, and for storing the result of this operation of addition in a fourth address location of said first memory means.

3. A digital differential analyzer according to claim 1, further comprising control means for storing a first constant, second constant and a numeral having a value of 0.0 in first, second and third address locations of said first memory means, respectively, for storing a numeral having a value of 0.0 in first and second address locations of said third memory means, for inputting the content of the first address location of said first memory means as a value of an integrand and outputting a third increment to said second memory means while taking the two higher order bits of a mantissa of said value of said integrand inclusive of a sign bit thereof as a mantissa of said third increment and taking an exponent of said value of said integrand as an exponent of said third increment, for thereafter setting all higher order m bits of the mantissa of the value of said integrand to zero, for then normalizing the value of said integrand so that the absolute value of the mantissa of the value of said integrand is not smaller than 0.5, for outputting the normalized value of said integrand to said first memory means, for inputting said third increment as a first increment from said second memory means, for producing a partial product of said first and second constants as a third increment through the operations of said first to fourth arithmetic operation means, for storing said partial product in said second memory means, for causing said first arithmetic operation means to perform the operation of addition using this third increment as a second increment, and for storing the result of this operation of addition in said first memory means.

* * * * *